(12) United States Patent
Choi et al.

(10) Patent No.: US 12,181,346 B2
(45) Date of Patent: Dec. 31, 2024

(54) APPARATUS AND METHOD FOR ESTIMATING A PHASE RETARDER AND METHOD OF MANUFACTURING THE PHASE RETARDER USING THE SAME

(71) Applicant: ELECTRONICS AND TELECOMMUNICATIONS RESEARCH INSTITUTE, Daejeon (KR)

(72) Inventors: Ki Hong Choi, Daejeon (KR); Joong Ki Park, Daejeon (KR); Kee Hoon Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 17/903,313

(22) Filed: Sep. 6, 2022

(65) Prior Publication Data
US 2023/0116262 A1     Apr. 13, 2023

(30) Foreign Application Priority Data

Sep. 29, 2021 (KR) .................. 10-2021-0128465
Jun. 22, 2022 (KR) .................. 10-2022-0076169

(51) Int. Cl.
*G01N 21/95*     (2006.01)
*G01J 3/447*     (2006.01)
(Continued)

(52) U.S. Cl.
CPC ..................... *G01J 9/00* (2013.01)

(58) Field of Classification Search
CPC .... G01J 9/00; G01J 3/447; G01J 4/04; G01N 21/95; G01N 21/21; G01N 2021/9511; G01N 2021/9513; G01M 11/00
See application file for complete search history.

(56) References Cited

U.S. PATENT DOCUMENTS

| 7,202,950 B2 * | 4/2007 | Shribak ................. G01N 21/19 356/364 |
| 8,873,894 B2 | 10/2014 | Kim |
| 2012/0164317 A1 | 6/2012 | Kim et al. |

FOREIGN PATENT DOCUMENTS

| CN | 110631806 A * | 12/2019 |
| JP | 2000-065531 A | 3/2000 |

(Continued)

*Primary Examiner* — Michael A Lyons
*Assistant Examiner* — Sebastian A Arnez
(74) *Attorney, Agent, or Firm* — LRK PATENT LAW FIRM

(57) ABSTRACT

Disclosed herein an apparatus and method for estimating a phase retarder and method of manufacturing the phase retarder using the same. The apparatus includes: a polarization element configured to output an incident light as a linear polarization and to make the linear polarization incident onto a phase retarder to be tested; a polarization image acquisition module equipped with a plurality of polarized pixels receiving an emitting light that is output from the phase retarder, on which the linear polarization is incident, and configured to obtain a polarization image based on the emitting light that is modulated in the polarized pixels; and a processor configured to evaluate quality of the phase retarder based on uniformity of a brightness value between polarized pixels of the polarization image. The polarized pixels modulate the emitting light based on a plurality of transmission angles and detects the modulated emitting light.

20 Claims, 5 Drawing Sheets

(51) Int. Cl.
*G01J 4/04* (2006.01)
*G01J 9/00* (2006.01)
*G01M 11/00* (2006.01)
*G01N 21/21* (2006.01)

(56) References Cited

FOREIGN PATENT DOCUMENTS

| | | | | |
|---|---|---|---|---|
| JP | 2005-055391 | A | 3/2005 | |
| JP | 2012-032346 | A | 2/2012 | |
| JP | 2013-205015 | A | 10/2013 | |
| JP | 5399453 | B2 | 1/2014 | |
| JP | 2020-024125 | A | 2/2020 | |
| KR | 10-1249119 | B1 | 3/2013 | |
| KR | 10-1358481 | B1 | 2/2014 | |
| KR | 10-2016-0046811 | A | 4/2016 | |
| KR | 10-2019-0030168 | A | 3/2019 | |
| WO | WO-2019137109 | A1 * | 7/2019 | ....... G02F 1/133528 |

* cited by examiner

APPARATUS AND METHOD FOR ESTIMATING A PHASE RETARDER AND METHOD OF MANUFACTURING THE PHASE RETARDER USING THE SAME

CROSS REFERENCE TO RELATED APPLICATIONS

The present application claims priority to a Korean patent applications No. 10-2021-0128465, filed Sep. 29, 2021 and No. 10-2022-0076169, filed Jun. 22, 2022, the entire contents of which are incorporated herein for all purposes by this reference.

BACKGROUND OF THE INVENTION

1. Field of the Invention

The present disclosure relates to an apparatus and method for estimating a phase retarder and a method for manufacturing the phase retarder using the same, and more particularly, to an apparatus and method for estimating the performance of a phase retarder at a single exposure and in a large area and measuring the performance of the phase retarder for various colors, that is, for full color, and to a method for manufacturing the phase retarder using the same.

2. Description of Related Art

Various image display devices like liquid displays, organic light emitting displays and hologram displays have been widely developed or are being used in recent years.

As diverse errors occur to image display devices during a manufacturing process before they are released, various testing processes are performed, and optical elements like polarizer and phase retarder are one type of components that are used most frequently in an image display device. Defects of optical elements are one of the main causes of a faulty image display device. As for detecting a defect of an optical film, when a defect is detected and identified, repairing or discarding according to the defect and even removing a cause of the defect constitute an important part of a manufacturing process with respect to production yield.

Meanwhile, a polarization state may be represented by two axes orthogonal to each other, and a phase retarder is an optical element that relatively retards an axis orthogonal to a polarization reference axis of an incident light. A phase retarder may be fabricated as a birefringent crystal. As the demand for waveplates with large thin films is increasing in the flat panel display technology, film-type phase retarders based on polymer liquid crystal are also widely used.

A polarimeter is conventionally used to measure a detect of a phase retarder. In a method for measuring a detect by using a polarimeter, a polarization state may be estimated by rotating a polarizer in front of an optical sensor and observing and combining intensity at a specific time interval. However, the measuring method has the disadvantage that it takes a lot of time to collect sample data for measuring the polarization of a phase retarder. Furthermore, the measuring method cannot measure the retarder of large area in a short time.

SUMMARY

A technical object of the present disclosure is to provide an apparatus and method for estimating performance of a phase retarder at a single exposure and over a large area and measuring the performance of the phase retarder for various colors, that is, for full color, and a method for manufacturing the phase retarder using the apparatus and method.

The technical objects of the present disclosure are not limited to the above-mentioned technical objects, and other technical objects that are not mentioned will be clearly understood by those skilled in the art through the following descriptions.

According to the present disclosure, there is provided an apparatus for estimating a phase retarder, the apparatus comprising: a polarization element configured to output an incident light as a linear polarization and to make the linear polarization incident onto a phase retarder to be tested; a polarization image acquisition module equipped with a plurality of polarized pixels receiving an emitting light that is output from the phase retarder, on which the linear polarization is incident, and configured to obtain a polarization image based on the emitting light that is modulated in the polarized pixels; and a processor configured to evaluate quality of the phase retarder based on uniformity of a brightness value between polarized pixels of the polarization image. The polarized pixels modulate the emitting light based on a plurality of transmission angles and detects the modulated emitting light.

According to the embodiment of the present disclosure in the apparatus, each of the plurality of polarized pixels may be configured to have a plurality of transmission angles.

According to the embodiment of the present disclosure in the apparatus, the polarized pixels may be configured to include micro pixels at each of the plurality of transmission angles.

According to the embodiment of the present disclosure in the apparatus, the micro pixels may include a micro polarizer and an image sensor, which are arranged in a direction of receiving the emitting light, and the micro polarizer may be formed to have a transmission axis with a different transmission angle in each of the micro pixels constituting the polarized pixels.

According to the embodiment of the present disclosure in the apparatus, the polarization image acquisition module further may comprise a micro lens array equipped with a micro lens that is placed in front of the micro pixels in the direction of receiving the emitting light. The micro lens array may comprise a plurality of micro lenses that are arranged to cover the plurality of polarized pixels.

According to the embodiment of the present disclosure in the apparatus, the processor may be further configured to: obtain a minute brightness value of each the micro pixels from the polarization image, correct the minute brightness value based on a quantum efficiency of the each of the micro pixels, and obtain a brightness value of each of the polarized pixels based on the corrected minute brightness value. The quantum efficiency may be a ratio between a light amount of the emitting light and an output light amount of the emitting light that has passed through the micro pixels.

According to the embodiment of the present disclosure in the apparatus, the quantum efficiency may use a relative quantum efficiency that is measured at each of the transmission angles in each wavelength of the emitting light. The relative quantum efficiency may be a value that is obtained by dividing an actual quantum efficiency of each of the micro pixels by an average value of actual quantum efficiencies corresponding to transmission angles of the micro pixels that constitute the polarized pixels.

According to the embodiment of the present disclosure in the apparatus, the plurality of polarized pixels may be clustered into groups, and at least part of polarized pixels within the groups are configured to be expressed in different color channels.

According to the embodiment of the present disclosure in the apparatus, the processor may be further configured to: determine uniformity based on a standard deviation that is based on brightness values of the plurality of polarized pixels in the polarization image, and determine that the phase retarder has fair quality in response to the standard deviation being equal to or less than a permissible tolerance.

According to another embodiment of the present disclosure, there is provided a method for estimating a phase retarder by using an apparatus for estimating a phase retarder, which is equipped with a polarization element, a polarization image acquisition module having a plurality of polarized pixels, and a processor. The method comprising: outputting, by the polarization element, an incident light as a linear polarization and making the linear polarization incident onto a phase retarder to be tested; receiving, by the polarization image acquisition module, an emitting light, which is output from the phase retarder on which the linear polarization is incident, in a plurality of polarized pixels and obtaining a polarization image of the phase retarder based on the emitting light that is modulated in the polarized pixels; and evaluating, by the processor, quality of the phase retarder based on uniformity of a brightness value between polarized pixels of the polarization image. The polarized pixels modulate the emitting light based on a plurality of transmission angles and detect the modulated emitting light.

According to another embodiment of the present disclosure, there is provided a method for manufacturing a phase retarder by using an apparatus for estimating a phase retarder, which is equipped with a polarization element, a polarization image acquisition module having a plurality of polarized pixels, and a processor. The method comprising: outputting, by the polarization element, an incident light as a linear polarization and making the linear polarization incident onto a phase retarder sample; receiving, by the polarization image acquisition module, an emitting light, which is output from the phase retarder sample on which the linear polarization is incident, in a plurality of polarized pixels and obtaining a polarization image of the phase retarder sample based on the emitting light that is modulated in the polarized pixels; evaluating, by the processor, quality of the phase retarder sample based on uniformity of a brightness value between polarized pixels of the polarization image; transmitting, by the processor, a fair quality message to a phase retarder manufacturing device in response to the phase retarder sample being evaluated to have fair quality, in order to apply a manufacturing processing condition of the sample in the phase retarder manufacturing device; and transmitting, by the processor, a poor quality message to the phase retarder manufacturing device in response to the phase retarder sample being evaluated to have poor quality, in order to modify the manufacturing processing condition of the sample in the phase retarder manufacturing device. The polarized pixels modulate the emitting light based on a plurality of transmission angles and detect the modulated emitting light.

According to the present disclosure, it is possible to provide an apparatus and method for estimating performance of a phase retarder at a single exposure and over a large area and measuring the performance of the phase retarder for various colors, that is, for full color, and a method for manufacturing the phase retarder using the apparatus and method.

Particularly, when estimating the circular polarization modulation performance of a phase retarder, the quality related to a polarization state of a plurality of divisions of a phase retarder may be simultaneously estimated at a single exposure and over a large area by using a polarization image acquisition module in which polarized pixels with a plurality of transmission angles are arranged.

In addition, as a plurality of polarized pixels are formed to be expressed in various color channels, the circular polarization modulation performance of a phase retarder may be measured for full color at a single exposure.

Furthermore, a hologram may be taken using the specifications of an existing camera and camera lens, and the switchover between the existing camera lens and a holographic camera lens may be easily realized.

Effects obtained in the present disclosure are not limited to the above-mentioned effects, and other effects not mentioned above may be clearly understood by those skilled in the art from the following description.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

DETAILED DESCRIPTION OF THE INVENTION

Figure 1:
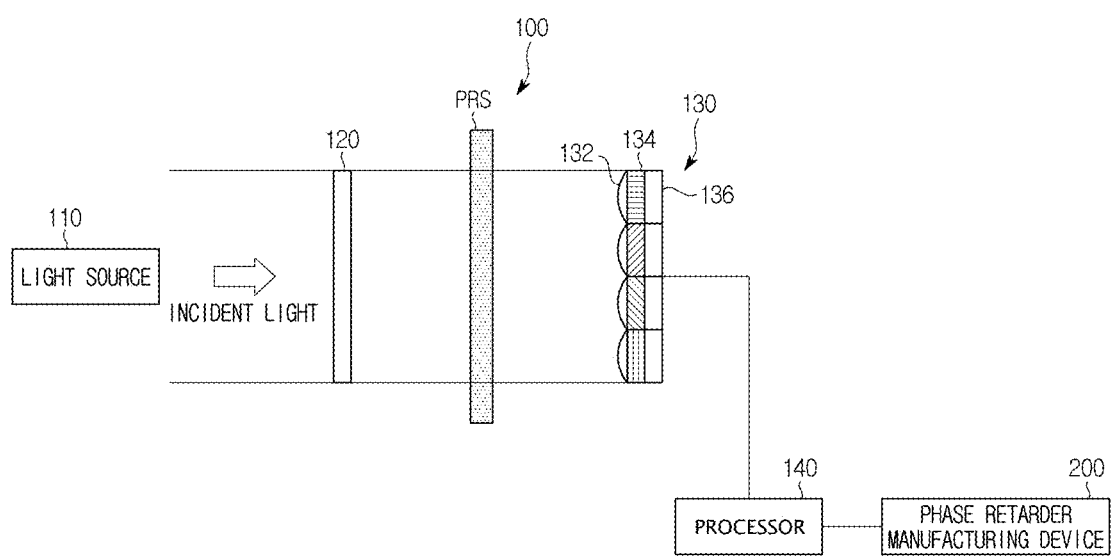
FIG. 1 is a view illustrating a configuration of an estimation device of a phase retarder according to an embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly another element or is connected to, coupled to or linked to another element linked to" with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be construed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", " " at Each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and in case drawings illustrated in the present specification are inversed, the location relations described in the specification may be inversely understood.

Hereinafter, embodiments of the present disclosure will be described with reference to the accompanying drawings.

Hereinafter, an estimation device of a phase retarder according to an embodiment of the present disclosure will be described with reference to FIG. 1. FIG. 1 is a view illustrating a configuration of an estimation device of a phase retarder according to an embodiment of the present disclosure.

Before the phase retarder estimation device 100 is described, phase retarders to be estimated or tested may be classified into half-waveplates and quarter-waveplates. The half-waveplate may be a waveplate that delays half the amount of an incident wavelength. When a linear polarization component is incident and passes through a half waveplate, the output may be a light with a pulse rotated 90 degrees. The quarter-waveplate may be a waveplate that delays a quarter (¼) of the amount of an incident wavelength. When a linear polarization component passes through a quarter-waveplate and an optical axis of the quarter-waveplate is aligned at 45 degrees from a pulse direction of the linear polarization component, a circular polarization may be output. When it is assumed, based on the IEEE sign convention, that the direction of a propagating beam is indicated by the thumb, if the rotation direction of a polarization vector corresponds to the other clenched fingers of the right hand, it may be referred to as the right circular polarization, and if the rotation direction corresponds to those of the left hand, it may be referred to as the left circular polarization.

In the present disclosure, a phase retarder, which is an object or sample to be tested in an estimation device, will be exemplified and described as a quarter-waveplate. The disclosure below is also applicable to a case in which a phase retarder is a half-waveplate. In addition, the present disclosure describes the phase retarder estimation device 100, which tests a phase retarder sample produced by a phase retarder manufacturing device 200 and provides feedback on an evaluation result to the phase retarder manufacturing device 200. Thus, according to a message about the evaluation result on which the feedback is provided, the phase retarder manufacturing device 200 may produce subsequent samples by maintaining a same manufacturing process condition as that of the sample or modifying the manufacturing process condition for phase retarders to be subsequently fabricated. Therefore, the present disclosure mainly describes a system including the phase retarder estimation device 100 and the phase retarder manufacturing device 200, but in another example, to estimate the quality of a phase retarder that is officially made, the phase retarder estimation device 100 may independently evaluate a phase retarder that is finally produced, without connection to the phase retarder manufacturing device 200.

Referring to FIG. 1, the phase retarder estimation device 100 may include a light source 110, a polarization element 120, a loading unit on which a phase retarder (PRS) manufactured by the phase retarder manufacturing device 200 is placed, a polarization image acquisition module 130, and a processor 140. As described above, in the present disclosure, a phase retarder is a phase retarder sample (or a quarter-waveplate sample) produced by the manufacturing device 200, and hereinafter, such a phase retarder sample may be abbreviated as PRS.

The light source 110 outputs an incident light towards a PRS and may be a light emitting element including a natural light or a laser beam.

The polarization element 120 may output an incident light as a linear polarization and make the linear polarization incident onto a phase retarder to be tested. The polarization element 120 may be configured as a linear polarizer. A linearly polarized state may be generated by making an unpolarized light pass through the polarization element 120 that is placed by elongating polymer in a single axis direction or by concentrating fine wires.

The polarization image acquisition module 130 may be equipped with a plurality of polarized pixels receiving an emitting light output from a RPS, on which a linear polarization is incident, and obtain a polarization image of the PRS based on an emitting light that is modulated at a polarized pixel 138. The polarized pixel 138 may modulate an emitting light based on a plurality of transmission angles and detect a modulated emitting light. The polarized pixel 138 may be defined as a unit pixel with a plurality of transmission angles, and the polarization image acquisition module 130 may consist of unit pixels that are arranged redundantly in two dimensions. As exemplified in FIG. 2, the polarized pixel 138 with a plurality of identical transmission angles may be repeatedly arranged across the polarization image acquisition module 130.

Figure 2:
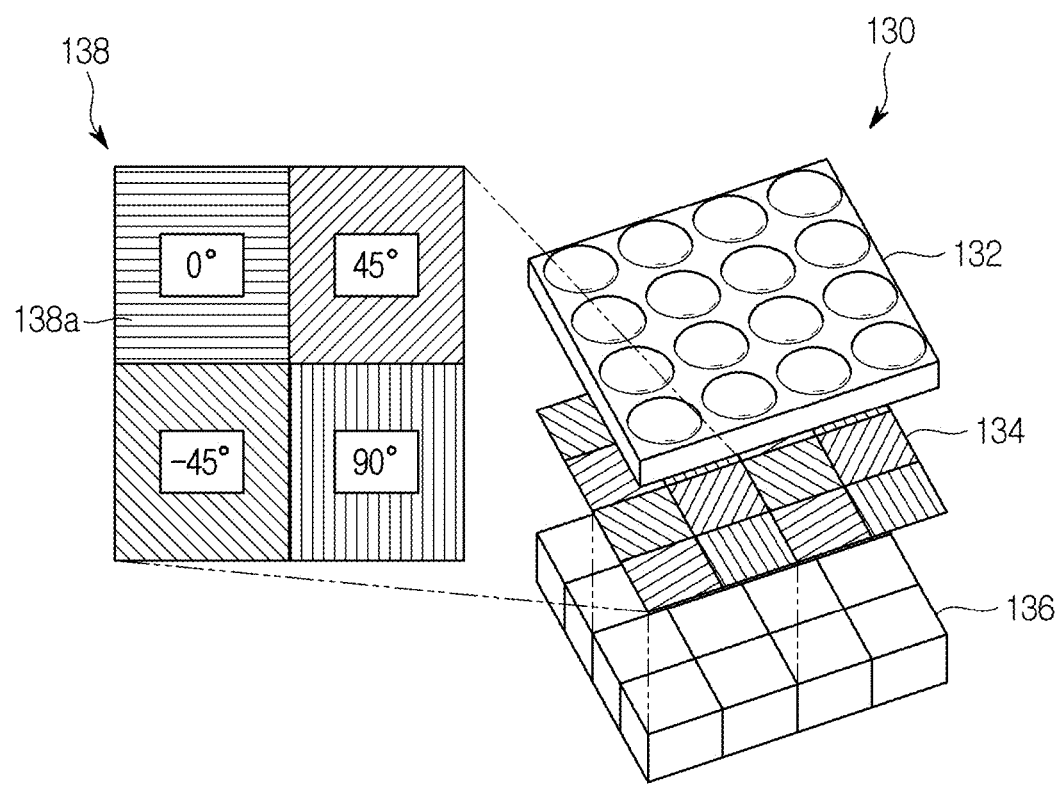
FIG. 2 is a view illustrating a configuration of a polarization image acquisition module.

FIG. 2 is a view illustrating a configuration of a polarization image acquisition module. FIG. 2 is a view for explaining a polarization image acquisition module formed in a pixel structure of a monochrome polarization image sensor which is applicable to the present disclosure.

Referring to FIG. 2, the polarization image acquisition module 130 may be equipped with a micro lens array 132, a micro polarizer array 134, and an image sensor array 136, which are arranged in a direction of receiving an emitting light. A combination of the micro polarizer array 134 and the image sensor array 136 may constitute the polarized pixels 138 that are arranged redundantly in two dimensions.

The polarized pixel 138 may modulate an emitting light based on a plurality of transmission angles and detect a modulated emitting light. Each polarized pixel 138 may be configured to include a micro pixel 138a at each of a plurality of transmission angles. The micro pixel 138a may include a micro polarizer and an image sensor that are placed in a direction of receiving an emitting light. The micro polarizer array 134 may include micro polarizers that are so arranged as to have a transmission axis at a different transmission angle in each micro pixel 138a of the polarized pixel 138. The image sensor array 136 may be attached to the micro polarizer array 134 and include image sensors that are so arranged to correspond to a micro polarizer of each micro pixel 138a.

An image sensor may be constructed by photodiodes, for example, and the image sensor array 136 may be formed in a structure where photodiodes are arranged in two dimensions. A plurality of micro polarizers within the polarized pixel 138 may modulate a circular polarization of a PRS into a linear polarization. In addition, a plurality of micro polarizers may be so arranged as to correspond to a plurality of partitions respectively of an image sensor in the polarized pixel 138.

Herein, in order to make a phase of linear polarization converted through a micro polarizer different in each micro polarizer, the light transmittance axes of micro polarizers may be formed to have different angles. In case a PRS is a quarter-waveplate, as exemplified in FIG. 2, the transmission angle of a light transmission axis in a micro polarizer may be formed to have any one of 4 different types of light transmittance axis angles that sequentially change at 45-degree intervals. Specifically, in order to have 4 transmission axes, the polarized pixel 138 may be equipped with micro polarizers formed at 2×2 transmission angles, which are different from each other. For example, the transmission angle of each micro polarizer may be rotated 0 degree, 45 degrees, 90 degrees and 135 degrees, and as described above, this is intended to adjust a geometric phase of a light wave. The rotated transmission angles of the micro polarizer described above are merely illustrative, to which the present disclosure is not limited. That is, a circular polarization from a PRS may be modulated by the micro pixel 138a having 4 transmission angles of the polarized pixel 138, and thus linear polarization images corresponding to the 4 transmission angles respectively may be emitted.

In order to enlarge a field of view for receiving an emitting light for ease of measuring a large area, the micro lens array 132 may be equipped with a micro lens placed in front of the micro pixel 138a in a direction of receiving the emitting light. A plurality of micro lenses may be arranged to cover all of a plurality of polarized pixels.

Figure 3:
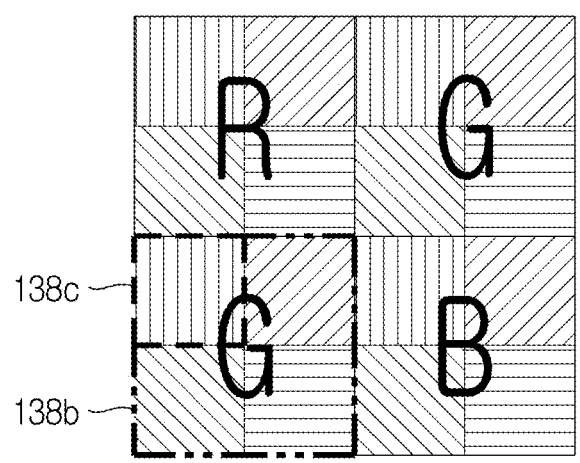
FIG. 3 is a view illustrating polarized color pixels.

As another example, the polarization image acquisition module 130 may be formed in a pixel structure of a color polarization image sensor, as illustrated in FIG. 3. FIG. 3 is a view illustrating polarized color pixels.

In order to measure the circular polarization modulation performance of a phase retarder for full color at a single exposure, a plurality of polarized color pixels 138 are clustered into groups, and at least part of polarized color pixels 138b within a group may be configured to be expressed in different color channels. For example, the polarized color pixel 138 may be formed by additionally attaching a color filter to the image sensor of FIG. 2. Specifically, a color filter with a same color may be combined with a plurality of image sensors corresponding to micro polarizers with different transmission angles that are allocated to a same color channel. Apart from the combination of a color filter, like the polarized pixel 138 of FIG. 2, the color polarized pixel 138 may include a plurality of micro polarizers, which have transmission axes of different transmission angles, and corresponding image sensors. That is, the polarized color pixel 138 may be equipped with a plurality of color micro pixels 138c with different transmission angles. Like in FIG. 2, the polarization image acquisition module 130 exemplified in FIG. 3 may be further equipped with a micro lens array that covers all the polarized color pixels 138b.

In case a PRS is a quarter-waveplate, 4 polarization components may be expressed by 3 color channels, for example, R, G and B respectively in one shot for the PRS. In case a group has 4 color channels, as exemplified in FIG. 3, the group may be set to have 3 different color channels and a color channel that is the same as one of them. As a concrete example, the group may consist of R, G, G and B. Herein, like in FIG. 2, each color channel may be configured to have 2×2 micro pixels that have different transmission angles. Each pixel may be based on wire-grid directions different from each other. Accordingly, a circular polarization of the PRS may be modulated to a linear polarization with 4 different phases in each color channel.

Hereinafter, apart from being intentionally described with respect to evaluating the performance of a PRS for full color, the polarized color pixel 138b and the micro color pixel 138c may be abbreviated as a polarized pixel and a micro pixel respectively or be used interchangeably therewith.

Referring to FIG. 1 again, the processor 140 may evaluate the quality of a phase retarder based on uniformity of brightness values between the polarized pixels 138 and 138b of a polarization image. For example, the quality of a phase retarder (PRS) may be not a local defect but uniformity of circular polarization modulation performance for an entire plane.

Specifically, the processor 140 may obtain a brightness value of each linear polarization image by acquiring images of a plurality of linear polarizations in which a circular polarization of a PRS is modulated by the polarized pixels 138 and 138b. In case the PRS is a quarter-waveplate, the circular polarization may be modulated by the micro pixels 138a and 138c having 4 transmission angles of the polarized pixels 138 and 138b, and thus linear polarization images corresponding to the 4 transmission angles respectively may be emitted.

According to the foregoing, the processor 140 may acquire a minute brightness value of each micro pixel 138a from a polarization image of the polarization image acquisition module 130. In order to secure the accuracy of uniformity evaluation, the processor 140 may correct a minute brightness value based on quantum efficiency of each micro pixel 138a and obtain a brightness value of each of the polarized pixels 138 and 138b based on the corrected minute brightness value. In the present disclosure, a brightness value of polarized pixels 138 and 138b based on a plurality of minute brightness values may be referred to as a unit brightness value, thereby being distinguished from the minute brightness values.

Figure 4:
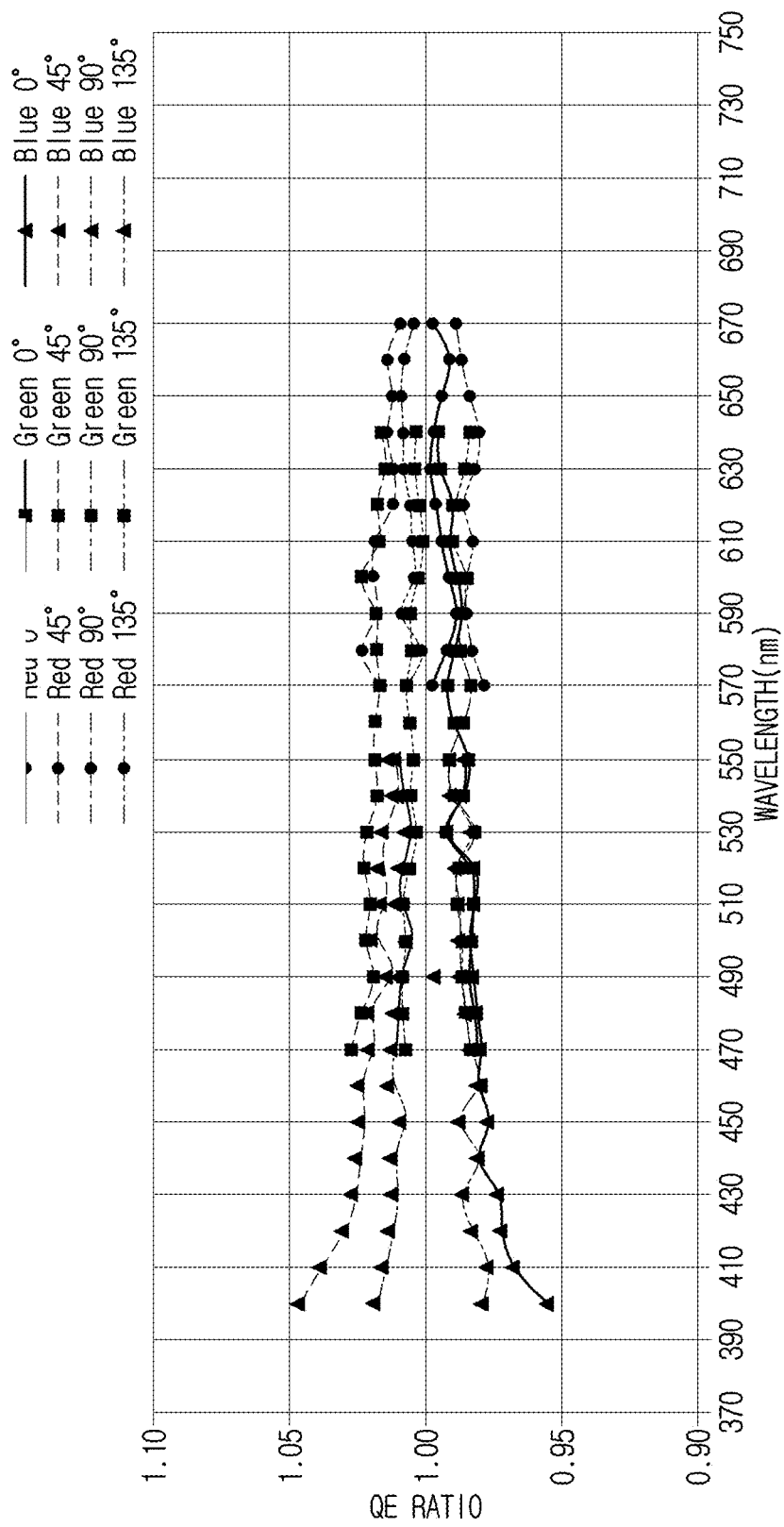
FIG. 4 is a graph exemplifying measurement data of relative quantum efficiency applied for correcting a minute brightness value of a micro pixel.

The quantum efficiency may be a ratio between an input light amount of an emitting light incident on the micro pixels 138a and 138c and an output light amount of the emitting light that has passed through the micro pixels 138a and 138c. More particularly, as exemplified in FIG. 4, it is possible to use a relative quantum efficiency that is measured in each wavelength of an emitting light of a PRS at each transmission angle. The relative quantum efficiency may be a value obtained by dividing an actual quantum efficiency of each of the micro pixels 138a and 138c by an average value of actual quantum efficiencies corresponding to transmission angles of the micro pixels 138a and 138c constituting the polarized pixels 138 and 138b. As illustrated in FIG. 3, in the case of the color polarized pixel 138b in green color having 4 transmission angles, a relative quantum efficiency according to green color may be calculated by dividing an average value of the actual quantum efficiencies of all the 4 green micro pixels 138c by an actual quantum efficiency of the green micro pixel 138c that is obtained at each transmission angle in a specific wavelength of light. In FIG. 3, based on the above calculation, it can be known that the red micro pixel 138c having transmission angles of 45 and 135 degrees has a relative quantum efficiency equal to or greater than 1, and the red micro pixel 138c having transmission angles of 0 and 90 degrees has a relative quantum efficiency less than 1. A relative quantum efficiency of the red or blue color polarized pixel 138c may be calculated like the above-described example.

The processor 140 may determine uniformity based on a standard deviation, which is based on unit brightness values of a corrected polarized pixel, and in response to the standard deviation being equal to or less than a permissible tolerance, may determine that a PRS has fair quality. The processor 140 may transmit a fair quality message concerning the PRS to the phase retarder manufacturing device 200. Receiving the fair quality message, the phase retarder manufacturing device 200 may apply a processing condition for making the PRS to fabricating an actual phase retarder.

When the standard deviation exceeds the permissible tolerance, the processor 140 may determine that a PRS has poor quality. The processor 140 may transmit a poor quality message concerning the PRS to the phase retarder manufacturing device 200. Receiving the poor quality message, the phase retarder manufacturing device 200 may modify the processing condition for making the PRS. The phase retarder manufacturing device 200 may fabricate a new sample according to the modified condition and send the new sample to the phase retarder estimation device 100, and the phase retarder estimation device 100 may evaluate the quality of the new sample and give feedback on an evaluation result to the phase retarder manufacturing device 200.

Hereinafter, an optical principle applied to the polarization element 120 of the phase retarder estimation device 100, a PRS and the polarization image acquisition module 130, and equations applied to evaluating the PRS will be described.

Observing a polarization state in a light may be checking a statistic behavior of electromagnetic waves pulsing on a horizontal axis. When the pulsing direction of a light can be statistically expressed only in one dimension, the light may be referred to as a linear polarization state. When the pulsing direction of a light can be expressed by a two-dimensional vector, the light may be referred to as an elliptical polarization state. When a phase difference between two vectors of polarizations orthogonal to each other is 90 degrees, it may be a circular polarization state. Depending on whether a phase of another vector precedes or is retarded with respect to a criterion of two vectors orthogonal to each other, the circular polarization state may be either a left circular polarization state or a right circular polarization state.

A circular polarization state may be generated by making a linearly polarized light pass through a quarter-waveplate that has an optical axis rotated 45 degrees with respect to a linear polarization angle. As the optical path of the waveplate used herein becomes further from ¼ of an incident light wavelength, an output polarization may become elliptical.

Using a linear polarization having a transmission axis at an angle θ, a waveplate (or phase retarder) having a retardation of Γ and an optical axis ψ, and an analyzer (or the micro pixels 138a and 138c) having a transmission axis at an angle δ, a series of circuits output by a linearly polarized light may be expressed by Jones matrix notation, as shown in Equation 1.

$$R(-\delta)\begin{bmatrix}1 & 0\\ 0 & 0\end{bmatrix}R(\delta)R(-\Psi)\begin{bmatrix}e^{-i\Gamma/2} & 0\\ 0 & e^{i\Gamma/2}\end{bmatrix}R(\Psi)\begin{bmatrix}\cos\theta\\ \sin\theta\end{bmatrix} \qquad \text{[Equation 1]}$$

Here, $$R(\phi) = \begin{bmatrix}\cos\phi & \sin\phi\\ -\sin\phi & \cos\phi\end{bmatrix},$$

which means a rotational transform. When an incident light has a linear polarization state at 0 degree and passes through a quarter-waveplate with Γ=½, a matrix expression is simplified as in Equation 2.

$$\begin{bmatrix}\cos^2\delta & \cos\delta\sin\delta\\ \sin\delta\cos\delta & \sin^2\delta\end{bmatrix}\begin{bmatrix}1 & -i\\ -i & 1\end{bmatrix}\begin{bmatrix}1\\ 0\end{bmatrix} = e^{-i\delta}\begin{bmatrix}\cos\delta\\ \sin\delta\end{bmatrix} \qquad \text{[Equation 2]}$$

A quarter-waveplate may be ideally fabricated, an optical axis may be aligned at 45 degrees from a linear polarizer (polarization element 120), and a light output from the quarter-waveplate may be a perfectly circular polarization. However, as a quarter-waveplate, which is actually fabricated, retards a phase as late as ¼ of a wavelength or has a misaligned angle or optical modulation does not normally occur due to a material feature, a few elliptical polarization components may be output due to such a problem. In this case, after a linearly polarized light passes through the fabricated quarter-waveplate, when the polarization image acquisition module 130 according to the present disclosure is used, the difference of intensity may occur remarkably in each of the polarized pixels 138 and 138b.

When a component of a linear polarization passes through an ideal quarter-waveplate and passes through a linear polarizer (or micro polarizer) at any angle again, an brightness recorded in an image sensor may be uniform irrespective of an angle of a linear polarizer (or micro polarizer), as shown in Equation 3.

$$\text{Intensty} = \left| e^{-i\delta} \begin{bmatrix} \cos\delta \\ \sin\delta \end{bmatrix} \right|^2 = |e^{-i\delta}\cos\delta|^2 + |e^{-i\delta}\sin\delta|^2 = 1 \quad \text{[Equation 3]}$$

According to the present disclosure, when estimating the circular polarization modulation performance of a phase retarder, the quality related to a polarization state of a plurality of divisions of the phase retarder may be simultaneously estimated at a single exposure and over a large area by using the polarization image acquisition module 130, in which the polarized pixels 138 and 138b with a plurality of transmission angles are arranged, and simple operations like Equation 2 and Equation 3. In addition, as a plurality of polarized color pixels 138b are formed to be expressed in various color channels, the circular polarization modulation performance of a phase retarder may be measured for full color at a single exposure.

Figure 5:
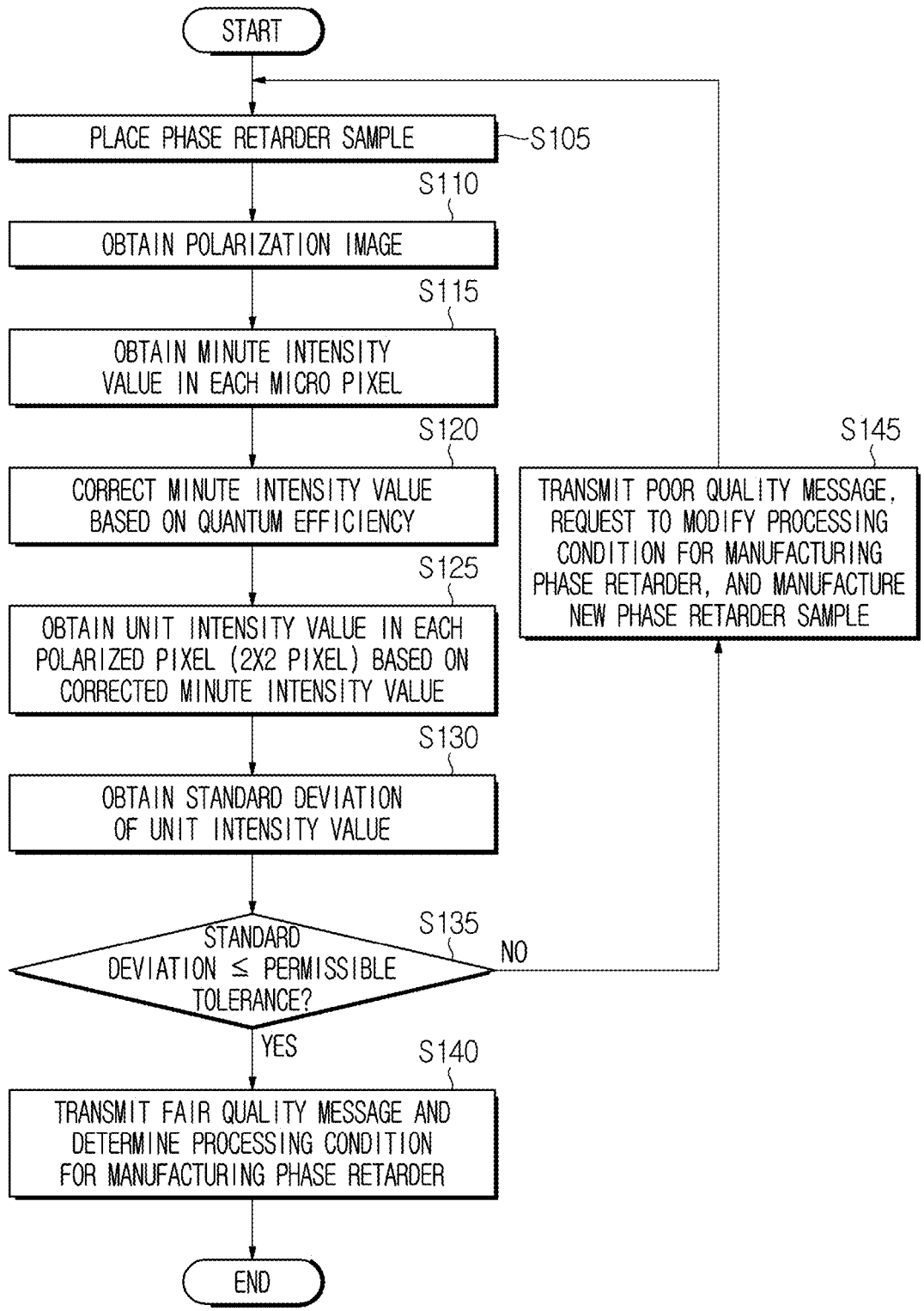
FIG. 5 is a flowchart showing a method for manufacturing a phase retarder by using a method for estimating the phase retarder according to another embodiment of the present disclosure.

Hereinafter, referring to FIG. 5, together with an estimating method using an estimation device for a phase retarder, a method for manufacturing a phase retarder will be described. FIG. 5 is a flowchart showing a method for manufacturing a phase retarder by using a method for estimating the phase retarder according to another embodiment of the present disclosure.

First, a phase retarder sample (PRS) fabricated by the phase retarder manufacturing device 200 may be placed in a loading unit of the phase retarder estimation device 100 (S105).

In addition, the polarization element 120 may output an incident light from the light source as a linear polarization and make the linear polarization incident onto a phase retarder sample (PRS).

In the present disclosure, the phase retarder sample (PRS) is exemplified as a quarter-waveplate, but the same is applicable to a half-waveplate sample.

Next, the polarization image acquisition module 130 may receive, from a plurality of polarized pixels 138, an emitting light output from the RPS, on which a linear polarization is incident, and obtain, from the polarized pixel 138, a polarization image of the PRS based on the emitting light (S110).

The emitting light from the PRS, or the circular polarization, for example, may be modulated by the micro pixels 138a and 138c having 4 transmission angles of the polarized pixels 138 and 138b, and thus linear polarization images corresponding to the 4 transmission angles respectively may be emitted. In the case of a polarized color pixel, a circular polarization of the PRS may be modulated to a linear polarization with 4 different phases in each color channel, so that 4 linear polarization images may be output in each color channel.

Next, the processor 140 may acquire a minute brightness value of each of the micro pixels 138a and 138c from a polarization image (S115).

Next, the processor 140 may correct a minute brightness value based on a quantum efficiency in each of the micro pixels 138a and 138c (S120).

The quantum efficiency may be a ratio between a light amount of an emitting light and an output light amount of the emitting light that has passed through the micro pixels 138a and 138c. A measured relative quantum efficiency may be used as a quantum efficiency. The relative quantum efficiency may be a value obtained by dividing an actual quantum efficiency of each of the micro pixels 138a and 138c by an average value of actual quantum efficiencies corresponding to transmission angles of the micro pixels 138a and 138c constituting the polarized pixel 138. When a minute brightness value is corrected based on the color micro pixel 138c, the relative quantum efficiency exemplified in FIG. 4 may be applied to the correction.

Next, the processor 140 may acquire a unit brightness value of each of the polarized pixels 138 and 138b based on the corrected minute brightness value (S125).

In the case of a quarter wave, a unit brightness value may be an average of a set of individual minute brightness values of each of the polarized pixels 138 and 138b or of minute brightness values in each of the polarized pixels 138 and 138b but is not limited the above-described example and may be determined in various ways.

Next, the processor 140 may acquire uniformity based on a standard deviation which is based on unit brightness values of a corrected polarized pixel (S130).

In case the standard deviation is equal to or less than a permissible tolerance (Y of S135), the processor 140 may determine that the PRS has fair quality, and the processor 140 may transmit a fair quality message regarding the PRS to the phase retarder manufacturing device 200 (S140). Receiving the fair quality message, the phase retarder manufacturing device 200 may apply a processing condition for making the PRS to fabricating an actual phase retarder.

Figure 6A:
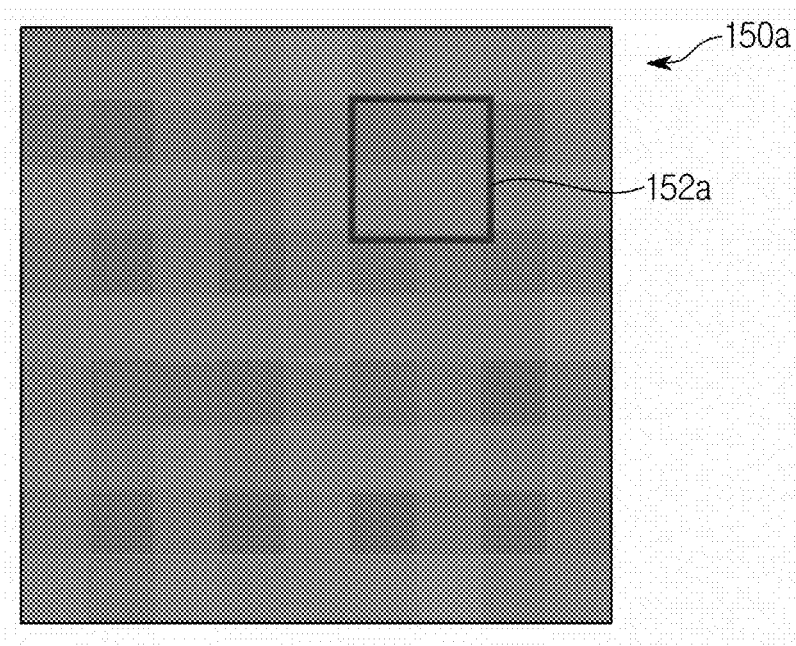
FIG. 6A and FIG. 6B are views exemplifying brightness value distributions of polarization images that are determined to be fair quality and poor quality respectively.
Figure 6B:
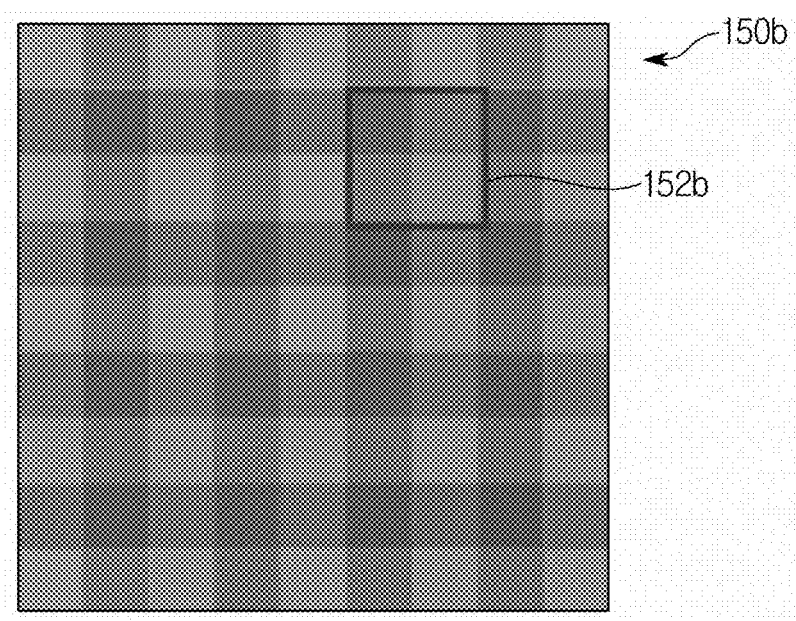

FIG. 6A and FIG. 6B are views exemplifying brightness value distributions of polarization images that are determined to be fair quality and poor quality respectively.

The distribution 150a of brightness values of the polarization image in a phase retarder sample (PRS) formed as a quarter-waveplate, as exemplified in FIG. 6A, shows that the unit brightness values distribution 152a of each polarized pixel 138 has a low uniformity. This reveals that an emitting light output from the PRS is close to a circular polarization. In this case, the processor 140 may determine that the standard deviation based on unit brightness values is equal to or less than the permissible tolerance and thus determine that the PRS has fair quality.

In case the standard deviation exceeds the permissible tolerance (N of S135), the processor 140 may determine the PRS to be poor and transmit a poor quality message regarding the PRS to the phase retarder manufacturing device 200 (S145). Receiving the poor quality message, the phase retarder manufacturing device 200 may modify the processing condition for making the PRS. The phase retarder manufacturing device 200 may fabricate a new sample according to the modified condition and send the new sample to the phase retarder estimation device 100, and the phase retarder estimation device 100 may evaluate the quality of the new sample and give feedback on an evaluation result to the phase retarder manufacturing device 200.

The distribution 150b of brightness values of the polarization image in a phase retarder sample (PRS) formed as a quarter-waveplate, as exemplified in FIG. 6B, shows that the unit brightness values distribution 152b of each polarized pixel 138 has significant lack of uniformity. This reveals that an emitting light output from the PRS is not output as a circular polarization. In this case, the processor 140 may determine that the standard deviation based on unit brightness values exceeds the permissible tolerance and thus determine that the PRS has poor quality.

In addition, in the case of the polarized color pixel 138*b*, a polarization image is obtained at each of a plurality of transmission angles for full color like R, G and B, and full-color circular polarization modulation performance (uniformity of modulation performance) may be evaluated across the overall area of the quarter-waveplate by using a minute brightness value and a unit brightness value of a linear polarization image according to each color and each transmission angle.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. An apparatus for estimating a phase retarder, the apparatus comprising:
a polarization element configured to output an incident light as a linear polarization and to make the linear polarization incident onto a phase retarder to be tested;
a polarization image acquisition module equipped with a plurality of polarized pixels receiving an emitting light that is output from the phase retarder, on which the linear polarization is incident, and configured to obtain a polarization image based on the emitting light that is modulated in the polarized pixels; and
a processor configured to evaluate quality of the phase retarder based on uniformity of a brightness value between polarized pixels of the polarization image,
wherein the polarized pixels modulate the emitting light based on a plurality of transmission angles and detects the modulated emitting light.

2. The apparatus of claim 1, wherein each of the plurality of polarized pixels is configured to have a plurality of transmission angles.

3. The apparatus of claim 1, wherein the polarized pixels are configured to include micro pixels at each of the plurality of transmission angles.

4. The apparatus of claim 3, wherein the micro pixels include a micro polarizer and an image sensor, which are arranged in a direction of receiving the emitting light, and
wherein the micro polarizer is formed to have a transmission axis with a different transmission angle in each of the micro pixels constituting the polarized pixels.

5. The apparatus of claim 4, wherein the polarization image acquisition module further comprises a micro lens array equipped with a micro lens that is placed in front of the micro pixels in the direction of receiving the emitting light, and
wherein the micro lens array comprises a plurality of micro lenses that are arranged to cover the plurality of polarized pixels.

6. The apparatus of claim 3, wherein the processor is further configured to:
obtain a minute brightness value of each the micro pixels from the polarization image,
correct the minute brightness value based on a quantum efficiency of the each of the micro pixels, and
obtain a brightness value of each of the polarized pixels based on the corrected minute brightness value, and
wherein the quantum efficiency is a ratio between a light amount of the emitting light and an output light amount of the emitting light that has passed through the micro pixels.

7. The apparatus of claim 6, wherein the quantum efficiency uses a relative quantum efficiency that is measured at each of the transmission angles in each wavelength of the emitting light, and
wherein the relative quantum efficiency is a value that is obtained by dividing an actual quantum efficiency of each of the micro pixels by an average value of actual quantum efficiencies corresponding to transmission angles of the micro pixels that constitute the polarized pixels.

8. The apparatus of claim 1, wherein the plurality of polarized pixels are clustered into groups, and at least part of polarized pixels within the groups are configured to be expressed in different color channels.

9. The apparatus of claim 1, wherein the processor is further configured to:
determine uniformity based on a standard deviation that is based on brightness values of the plurality of polarized pixels in the polarization image, and
determine that the phase retarder has fair quality in response to the standard deviation being equal to or less than a permissible tolerance.

10. A method for estimating a phase retarder by using an apparatus for estimating a phase retarder, which is equipped with a polarization element, a polarization image acquisition module having a plurality of polarized pixels, and a processor, the method comprising:
outputting, by the polarization element, an incident light as a linear polarization and making the linear polarization incident onto a phase retarder to be tested;
receiving, by the polarization image acquisition module, an emitting light, which is output from the phase retarder on which the linear polarization is incident, in a plurality of polarized pixels and obtaining a polarization image of the phase retarder based on the emitting light that is modulated in the polarized pixels; and
evaluating, by the processor, quality of the phase retarder based on uniformity of a brightness value between polarized pixels of the polarization image, wherein the polarized pixels modulate the emitting light based on a plurality of transmission angles and detect the modulated emitting light.

11. The method of claim 10, wherein each of the plurality of polarized pixels is configured to have a plurality of transmission angles.

12. The method of claim 10, wherein the polarized pixels are configured to include micro pixels at each of the plurality of transmission angles.

13. The method of claim 12, wherein the micro pixels include a micro polarizer and an image sensor, which are arranged in a direction of receiving the emitting light, and
wherein the micro polarizer is formed to have a transmission axis with a different transmission angle in each of the micro pixels constituting the polarized pixels.

14. The method of claim 13, wherein the polarization image acquisition module further comprises a micro lens array equipped with a micro lens that is placed in front of the micro pixels in the receiving direction, and
wherein the micro lens array comprises a plurality of micro lenses that are arranged to cover the plurality of polarized pixels.

15. The method of claim 12, wherein the evaluating of the quality of the phase retarder further comprises:
obtaining a minute brightness value of each of the micro pixels from the polarization image,
correcting the minute brightness value based on a quantum efficiency of the each of the micro pixels, and
obtaining a brightness value of each of the polarized pixels based on the corrected minute brightness value, and
wherein the quantum efficiency is a ratio between a light amount of the emitting light and an output light amount of the emitting light that has passed through the micro pixels.

16. The method of claim 15, wherein the quantum efficiency uses a relative quantum efficiency that is measured at each of the transmission angles in each wavelength of the emitting light, and
wherein the relative quantum efficiency is a value that is obtained by dividing an actual quantum efficiency of each of the micro pixels by an average value of actual quantum efficiencies corresponding to transmission angles of the micro pixels that constitute the polarized pixels.

17. The method of claim 10, wherein the plurality of polarized pixels are clustered into groups, and at least part of polarized pixels within the groups are configured to be expressed in different color channels.

18. The method of claim 10, wherein the evaluating of the phase retarder further comprises:
determining uniformity based on a standard deviation that is based on brightness values of the plurality of polarized pixels in the polarization image, and
determining that the phase retarder has fair quality in response to the standard deviation being equal to or less than a permissible tolerance.

19. A method for manufacturing a phase retarder by using an apparatus for estimating a phase retarder, which is equipped with a polarization element, a polarization image acquisition module having a plurality of polarized pixels, and a processor, the method comprising:
outputting, by the polarization element, an incident light as a linear polarization and making the linear polarization incident onto a phase retarder sample;
receiving, by the polarization image acquisition module, an emitting light, which is output from the phase retarder sample on which the linear polarization is incident, in a plurality of polarized pixels and obtaining a polarization image of the phase retarder sample based on the emitting light that is modulated in the polarized pixels;
evaluating, by the processor, quality of the phase retarder sample based on uniformity of a brightness value between polarized pixels of the polarization image;
transmitting, by the processor, a fair quality message to a phase retarder manufacturing device in response to the phase retarder sample being evaluated to have fair quality, in order to apply a manufacturing processing condition of the sample in the phase retarder manufacturing device; and
transmitting, by the processor, a poor quality message to the phase retarder manufacturing device in response to the phase retarder sample being evaluated to have poor quality, in order to modify the manufacturing processing condition of the sample in the phase retarder manufacturing device,
wherein the polarized pixels modulate the emitting light based on a plurality of transmission angles and detect the modulated emitting light.

20. The method of claim 19, wherein each of the plurality of polarized pixels is configured to have a plurality of transmission angles.

* * * * *